(12) United States Patent
Riefenstein et al.

(10) Patent No.: US 9,326,632 B2
(45) Date of Patent: May 3, 2016

(54) VALVE ARRANGEMENT OF A COMMERCIAL COOKING DEVICE AND COMMERCIAL COOKING DEVICE

(71) Applicants: Lutz Riefenstein, Weilheim (DE); Guenter Wurdinger, Peibenburg (DE)

(72) Inventors: Lutz Riefenstein, Weilheim (DE); Guenter Wurdinger, Peibenburg (DE)

(73) Assignee: CONVOTHERM ELEKTROGERAETE GMBH, Eglfing (DE)

( * ) Notice: Subject to any disclaimer, the term of this patent is extended or adjusted under 35 U.S.C. 154(b) by 489 days.

(21) Appl. No.: 13/749,340

(22) Filed: Jan. 24, 2013

(65) Prior Publication Data

US 2013/0192473 A1   Aug. 1, 2013

Related U.S. Application Data

(60) Provisional application No. 61/591,701, filed on Jan. 27, 2012.

(51) Int. Cl.

| A21B 3/13 | (2006.01) |
| F16K 31/12 | (2006.01) |
| A47J 27/00 | (2006.01) |
| F24C 15/20 | (2006.01) |
| F24C 15/32 | (2006.01) |
| F16K 17/04 | (2006.01) |
| F16K 31/06 | (2006.01) |

(52) U.S. Cl.
CPC ............... *A47J 27/00* (2013.01); *F16K 17/048* (2013.01); *F16K 31/0655* (2013.01); *F24C 15/2007* (2013.01); *F24C 15/327* (2013.01); *Y10T 137/7904* (2015.04)

(58) Field of Classification Search
CPC .... A47J 27/00; F16K 17/048; F16K 31/0655; F24C 15/2007; F24C 15/327
USPC ........ 99/324, 351–354, 382; 251/12, 84, 157, 251/205–209, 304, 336, 349; 137/528
See application file for complete search history.

(56) References Cited

U.S. PATENT DOCUMENTS

| 2,515,229 | A | * | 7/1950 | Jenkins ........................... 431/54 |
| 4,872,474 | A | * | 10/1989 | Middleton .......... A47J 37/1233 137/493.8 |
| 6,213,447 | B1 | * | 4/2001 | Bircann et al. ................... 251/86 |
| 2008/0073605 | A1 | * | 3/2008 | Ishigaki et al. ................. 251/12 |
| 2009/0045364 | A1 | * | 2/2009 | Busato .................. F16K 39/022 251/129.07 |

* cited by examiner

*Primary Examiner* — Dana Ross
*Assistant Examiner* — Ket D Dang
(74) *Attorney, Agent, or Firm* — Ohlandt, Greeley, Ruggiero & Perle, L.L.P.

(57) ABSTRACT

A valve structure includes a housing having an interior chamber, a first conduit connecting the interior chamber with a cooking chamber of a cooking device and having a first discharge cross-section, a second conduit connecting the interior chamber with the outside environment and having a second discharge cross-section, and at least one valve seat within the interior chamber having at least one valve seat opening which cooperates with at least one valve disc. The at least one valve disc moves between a closed position on the valve seat opening, and an open position spaced apart from the valve seat opening by changes in pressure in the cooking chamber. The valve operates to allow bidirectional flow of fluid to relieve over pressure and underpressure conditions, and enables automatic balancing of low pressure or vacuum in the cooking chamber.

17 Claims, 7 Drawing Sheets

VALVE ARRANGEMENT OF A COMMERCIAL COOKING DEVICE AND COMMERCIAL COOKING DEVICE

CROSS-REFERENCED APPLICATION

This application claims priority to U.S. Provisional Application No. 61/591,701, filed on Jan. 27, 2012, which is incorporated herein in its entirety by reference thereto.

BACKGROUND

1. Field of the Disclosure

The present disclosure relates to a valve arrangement of a commercial cooking device.

2. Discussion of the Background Art

A commercial cooking device comprises a cooking chamber enclosed by a door that can be opened and closed for providing access to the cooking chamber. If the door is opened during a cooking process, e.g., for loading or unloading food products, a pressure rise can occur when the door is closed as cold air streams into the cooking chamber and heats up and expands very quickly.

In order to balance such a pressure rise, a known valve arrangement comprises a housing that is connected to the cooking chamber via a first conduit. The interior of the housing of the valve arrangement is also connected to the atmosphere via a second conduit. A valve member that closes and opens the conduit leading to the cooking chamber is disposed in the housing. This valve member has the function of a pressure relief valve that is opened by the high pressure in the cooking chamber and opens the conduit and is closed and closes the conduit to the cooking chamber after the high pressure is relieved.

The valve disc of the known valve arrangement that opens and closes the conduit to the cooking chamber has a relatively small cross-sectional area and the flow resistance of the known valve arrangement is relatively high. In this state of the art valve arrangement, a valve disc is disposed in close relation to the conduit leading to the cooking device cooking chamber and is opened for allowing high pressure from the cooking chamber to escape by the influence of the high pressure in the cooking chamber which moves the valve disc away from the conduit. In a situation where there is a low pressure or near vacuum in the cooking chamber, or where fresh air must be allowed to enter the cooking chamber such as during dehumidification, the valve disc is unable to move away from the associated conduit, because low pressure, or fresh air entering from the outside, cause the valve disc to seal more tightly against the conduit leading to the cooking chamber. In this latter situation, the valve disc must be moved away from the associated conduit using a solenoid acting upon a stem affixed to the valve disc. There is no spring associated with the stem, so that movement of the valve disc is accomplished only by action of the solenoid upon the stem, or by gravity returning the valve disc to its closed location in close relation to the conduit.

SUMMARY

The present disclosure provides a valve arrangement that is able to reduce the flow resistance so that its pressure control characteristics are improved. In particular, the present disclosure overcomes the shortcomings of the state of the art. The present disclosure provides for faster release of any high pressure or over pressure in the cooking chamber, and also provides for faster balancing of pressures between the atmosphere and the cooking chamber when the cooking chamber is in a low pressure or vacuum state. In addition, the present disclosure provides for automatic balancing of such a low pressure or vacuum situation in the cooking chamber.

The valve arrangement according to the present disclosure makes it possible to use a larger valve disc that, in conjunction with the enlarged discharge cross-section of the valve seat opening, results in the advantage of a lower flow resistance. This, in turn, enhances the dehumidification of the cooking chamber and improves the balance of any pressure differences between the cooking chamber and the atmosphere.

In one particularly preferred embodiment of the present disclosure, the valve disc means of the valve arrangement comprises a vacuum valve disc as well as a pressure relief valve disc. This results in the advantage of an integration of a high-pressure and a low-pressure function that makes it possible to balance both an increased pressure as well as a vacuum or reduced pressure within the cooking chamber. This embodiment is especially advantageous because the creation of a reduced pressure within the cooking chamber by, e.g., spraying cold water into the cooking chamber for drying the chamber atmosphere, can result in the undesirable effect of sucking waste water into the cooking chamber.

More particularly, the valve arrangement of the present disclosure finds use in commercial cooking devices, in particular in those commercial cooking devices known as combi-steamers.

BRIEF DESCRIPTION OF THE DRAWINGS

Further advantageous, features and details of the present disclosure will become apparent from the following description of the drawings, in which.

DETAILED DESCRIPTION OF THE PREFERRED EMBODIMENT

Figure 1:
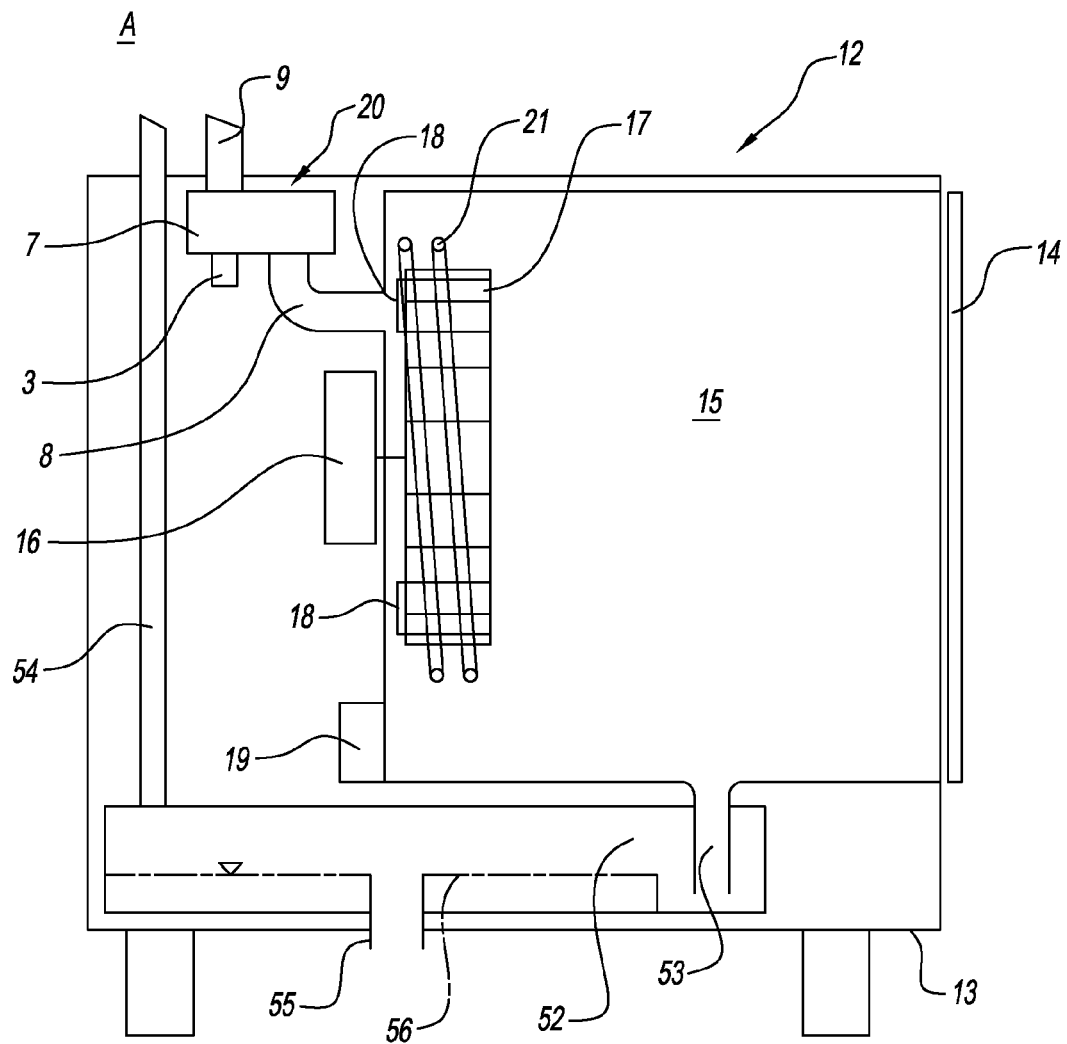
FIG. 1 shows a simplified depiction of a commercial cooking device according to the present disclosure in a highly simplified way.

FIG. 1 shows commercial cooking device 12, in particular a combi-steamer. Cooking device 12 comprises housing 13 with door 14 that can be opened and closed to expose interior of cooking device 12, i.e., cooking chamber 15, in order to load and unload food products into and out of cooking chamber 15. Fan wheel 17 is located within cooking chamber 15. Fan wheel 17 is driven by motor 16 and comprises fan blades 18 at rear side of fan wheel 17 in order to create a slight negative pressure behind fan wheel 17. Finally, cooking device 12 comprises control means 19 that is adapted to control all the components of cooking device 12, and valve arrangement 20. Valve arrangement 20 is connected to cooking chamber 15 by means of first conduit 8 and to atmosphere A by means of second conduit 9. Cooking chamber heater 21 is disposed next to fan wheel 17. Condenser 52 is connected with cooking chamber 15 via outlet 53. Condenser has water level 56 and drain 55 as well as air vent 54 leading from condenser 52 to atmosphere A. Drain 55 extends part way into condenser 52 to provide water level 56 inside condenser 52.

Valve arrangement 20 of the embodiment shown in FIG. 1 can be used for the purpose of active dehumidification of cooking chamber 15. So, upon opening valve arrangement 20, dry air can be sucked into cooking chamber 15 by means of the slight negative pressure created by fan blades 18 behind fan wheel 17. Thus, an air/vapour mixture can be guided via outlet 53, condenser 52 and air vent 54 to atmosphere A, providing a continuous flow of fluid between inlet 9 and outlet or air vent 54.

Embodiments and details of valve arrangement 20, including its functioning for an active dehumidification, will be described in the following paragraphs with reference to FIGS. 2 to 8.

Figure 2:
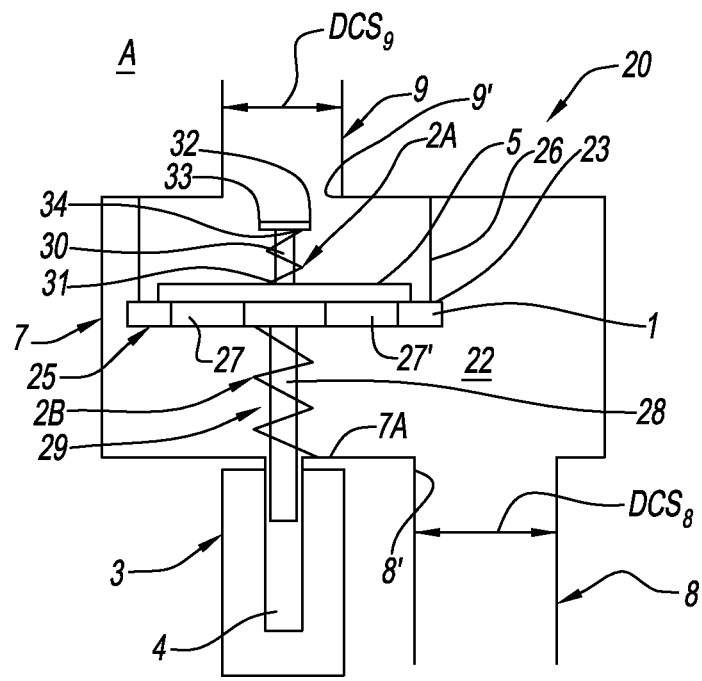
FIGS. 2 to 4 are highly simplified depictions of a first embodiment of a valve arrangement according to the present disclosure.
Figure 3:
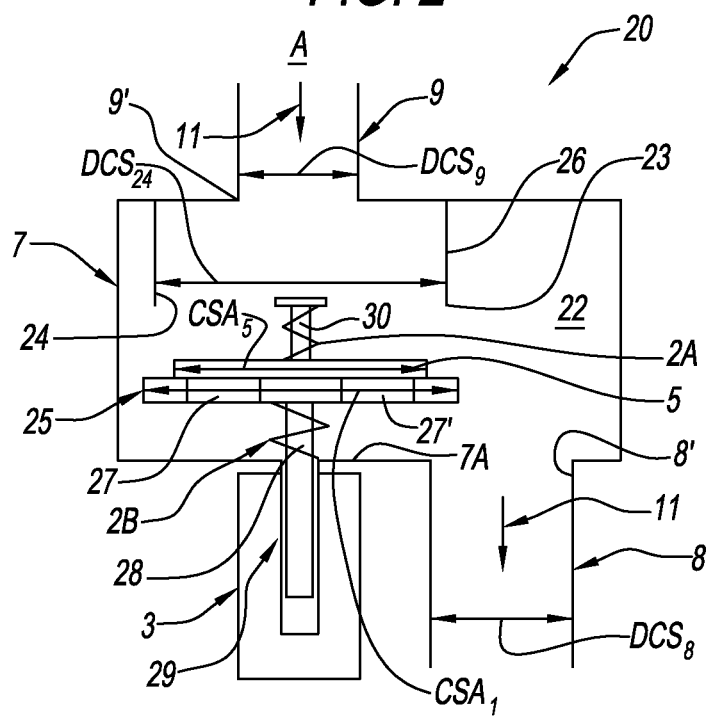
Figure 4:
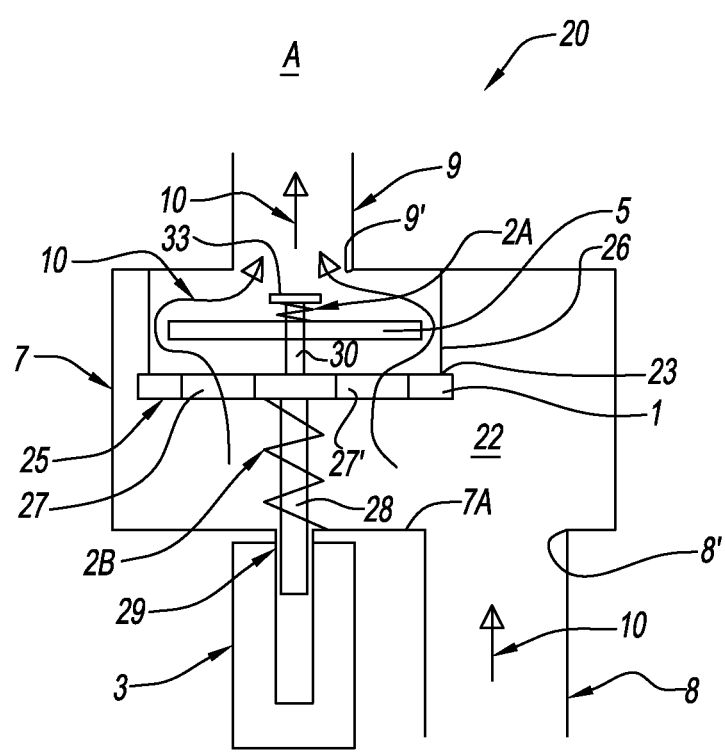

FIGS. 2 to 4 show a first embodiment of valve arrangement 20 in different switching positions.

As can be seen from FIGS. 2 to 4, valve arrangement 20 comprises housing 7 including first conduit 8 and second conduit 9. Conduits 8 and 9, respectively, connect interior chamber 22 of housing 7 with cooking chamber 15 and atmosphere A.

Valve arrangement 20 comprises, according to the embodiment shown in FIGS. 2 to 4, valve seat 23 that is disposed within interior chamber 22 of housing 7. Valve seat 23 includes valve seat opening 24 cooperating with valve disc means 25. Valve disc means 25 is moveably mounted between a closed position in which valve disc means 25 is seated on valve seat opening 24, as can be seen from FIG. 2. Moreover, valve disc means 25 can be moved to an open position in which valve disc means 25 is disposed away from valve seat opening 24 (see FIGS. 3 and 4).

To move valve disc means 25, actuator 3 is provided that is either fixed to housing 7 or a suitable position of cooking device 12. In the embodiment shown in FIGS. 2 to 4, actuator 3 can be, e.g., a solenoid cooperating with stem 29.

As can be best seen from FIG. 3 showing a switching condition in which valve disc means 25 is separated from valve seat opening 24, valve seat opening 24 has discharge cross-section $DCS_{24}$ that is represented by a double arrow. Discharge cross-section $DCS_{24}$ is larger than discharge cross-section $DCS_8$ of first conduit 8, and discharge cross-section $DCS_9$ of second conduit 9.

In order to provide larger discharge cross-section $DCS_{24}$ of valve seat opening 24, valve arrangement 20 of the present disclosure comprises, according to the embodiments of FIGS. 2 to 4, socket 26 that extends into interior chamber 22 of housing 7. As can be seen from FIGS. 2 to 4, socket 26 comprising valve seat opening 24 surrounds aperture 9' of second conduit 9, with aperture 9' opening into interior chamber 22.

The preferred embodiment of FIGS. 2 to 4 includes valve disc means 25 that comprises vacuum valve disc 1 that has at least one through-hole, preferably a plurality of through-holes that, according to the depicted embodiment of FIGS. 2 to 4, are represented by through-holes 27 and 27'.

Moreover, valve disc means 25 also comprises pressure relief valve disc 5 that is disposed next to vacuum valve disc 1 and can be moved relative to valve disc 1.

As can be seen from FIGS. 2 to 4, vacuum valve disc 1 has cross-sectional area $CSA_1$ that is larger than discharge cross-section $DCS_{24}$ of valve seat opening 24. In turn, pressure relief valve disc 5 has cross-sectional area $CSA_5$ that is smaller than discharge cross-section $DCS_{24}$ of valve seat opening 24.

Vacuum valve disc 1 is biased into a rest position by means of spring 2B that surrounds first length 28 of stem 29. First length 28 of stem 29 extends from vacuum valve disc 1 to actuator 3, as can be seen from FIGS. 2 to 4.

In order to be able to bias vacuum valve disc 1 into the closed position, one end of spring 2B abuts vacuum valve disc 1 and other end of spring 2B abuts shoulder 7A of housing 7.

Pressure relief valve disc 5 is biased into a closed position by second spring 2A that surrounds second length 30 of stem 29, with end 31 of spring 2A abutting pressure relief valve disc 5 and end 32 of spring 2A abutting stop plate 33 fixed to an end 34 of the second length 30.

FIGS. 2 and 3 show the closed position of pressure relief valve disc 5 blocking through-holes 27 and 27'.

FIG. 2 depicts the closed position of valve disc means 25 in which vacuum valve disc 1 is seated on valve seat 23, thus closing valve seat opening 24. Pressure relief valve disc 5 is pressed downwards onto vacuum valve disc 1, thus closing and blocking through holes 27 and 27'.

FIG. 3 shows the open position of valve disc means 25 in case of a high negative pressure within cooking chamber 15. In this situation, valve disc means 25 is displaced and lowered by means of high negative pressure within cooking chamber 15, thus spacing vacuum valve disc 1 from valve seat 23 so that valve seat opening 24 is opened. A flow of fresh air (represented by arrows 11 in FIG. 3) can flow from atmosphere A through second conduit 9 into interior chamber 22, through first conduit 8 out of interior chamber 22 and into cooking chamber 15, thus balancing the pressures between atmosphere A and cooking chamber 15. FIG. 3 also shows the position of valve disc means 25 in case of an active dehumidification for which purpose actuator 3 is operated such that valve disc means 25 is lowered in order to open valve seat opening 24 allowing fresh air into cooking chamber 15.

FIG. 4 shows a high pressure situation within cooking chamber 15. In this situation, vacuum valve disc 1 is pressed onto valve seat 23 by means of spring 2B thus closing valve seat opening 24. However, flow of air 10 flowing from cooking chamber 15 into interior chamber 22 of housing 7 and lifts pressure relief valve disc 5 upwards against the force of spring 2A. Through holes 27 and 27' are opened such that flow of air 10 can proceed from cooking chamber 15 through conduit 8 into interior chamber 22 through through-holes 27 and 27' into second conduit 9 and to atmosphere A.

Figure 5A:
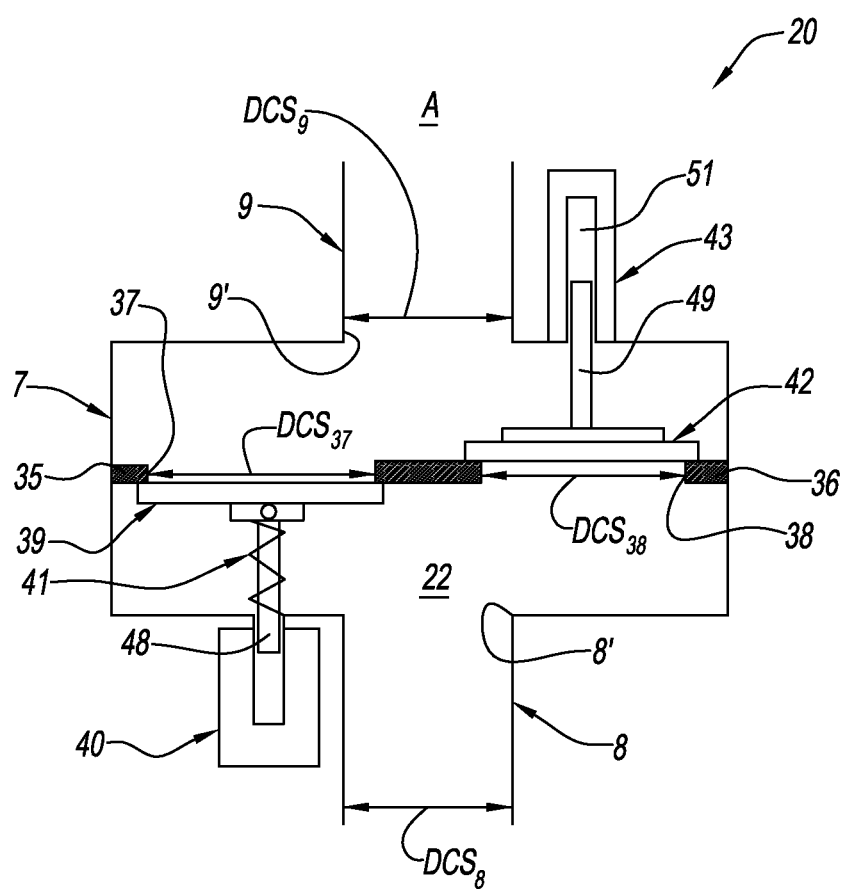
FIGS. 5A and 5B are highly simplified depiction of a second embodiment of the valve arrangement according to the present disclosure.

FIG. 5A shows a second embodiment of valve arrangement 20. In FIG. 5A, all the features that correspond to the first embodiment set forth in FIGS. 2-4 are designated with the same reference numerals.

As can be seen from FIG. 5A, this embodiment of valve arrangement 20 comprises valve seats 35 and 36 that are suitably disposed within housing 7. Each of valve seats 35 and 36 has associated valve seat opening 37 and 38, respectively, comprising associated discharge cross-sections $DCS_{37}$ and $DCS_{38}$, respectively. Discharge cross-sections $DCS_{37}$ and $DCS_{38}$ are larger than discharge cross-sections $DCS_8$ of conduit 8 and $DCS_9$ of conduit 9.

First valve seat opening 37 cooperates with vacuum valve disc 39 that is biased by spring 41 onto valve seat 35 thus closing valve seat opening 37. Valve seat opening 37 can be opened by high negative pressure in cooking chamber 15. Also, this embodiment comprises actuator 40 that cooperates with stem 48 fixed to vacuum valve disc 39. Actuator 40 can also be used for opening valve seat opening 37 for the purpose of dehumidification of cooking chamber 15. For this purpose, valve seat opening 37 can be opened by operating actuator 40.

Second valve seat 36 comprises valve seat opening 38 that cooperates with pressure relief valve disc 42. Pressure relief valve disc 42 is moveably mounted on guide means 43 by means of stem 49 that is fixed to pressure relief valve disc 42. Guide means 43 can be fixed to housing 7 and comprises inner bore 51 that guides stem 49.

If a high pressure is created in cooking chamber 15, pressure relief valve disc 42 will be lifted by the air flow out of cooking chamber 15 into interior chamber 22 so that valve seat opening 38 is opened and the air under high pressure can be vented via conduit 9 to atmosphere A.

In case of a vacuum or low pressure in cooking chamber 15, valve disc 39 will be lowered, thus opening valve seat opening 37 so that a flow of air from atmosphere A can flow through conduit 9 into interior chamber 22 and through conduit 8 into cooking chamber 15.

Figure 5B:
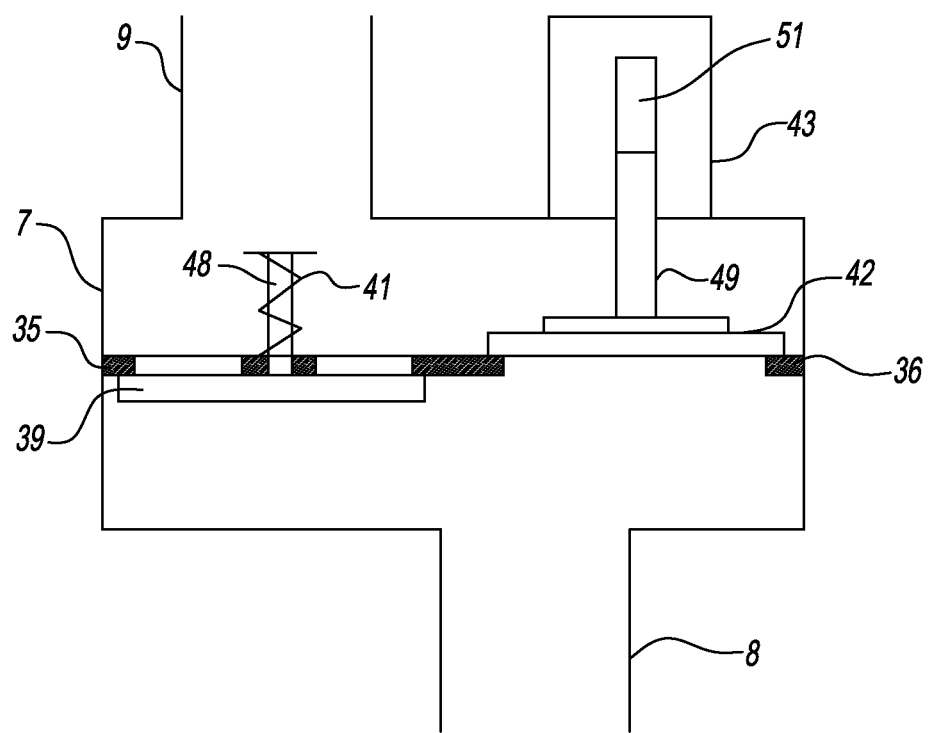

FIG. 5B is similar to FIG. 5A, except that stem 48 and spring 41 are disposed on the opposite side of valve seat 35 vacuum valve disc 39.

Figure 6:
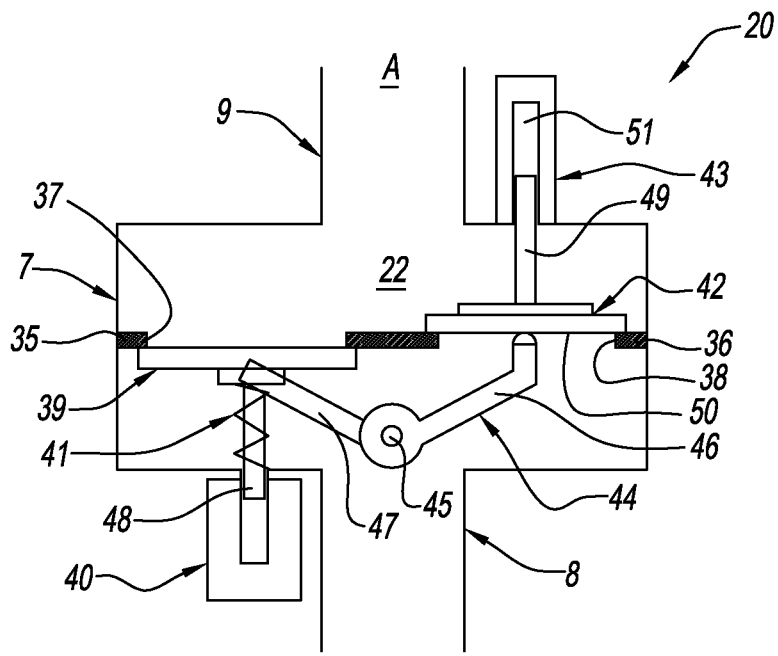
FIGS. 6 to 8 are highly simplified depictions of a third embodiment of the valve arrangement according to the present disclosure.
Figure 7:
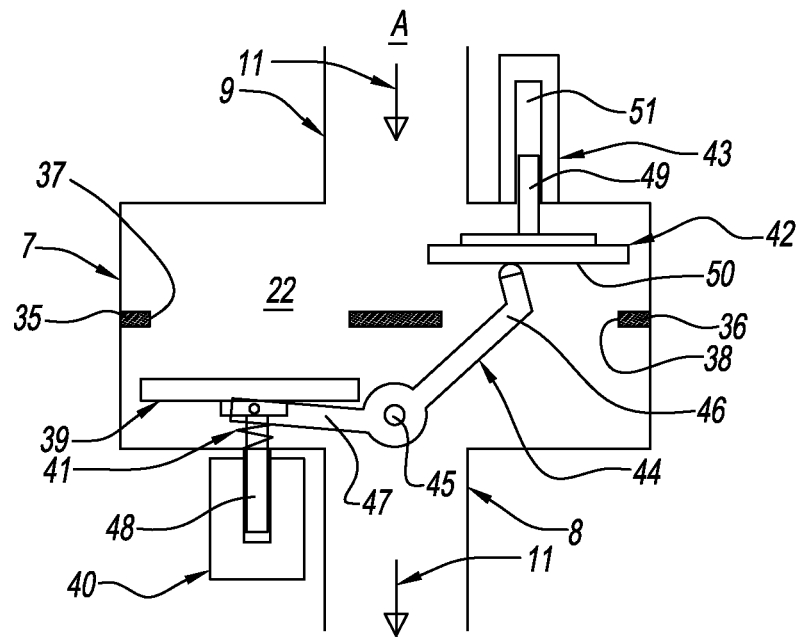
Figure 8:
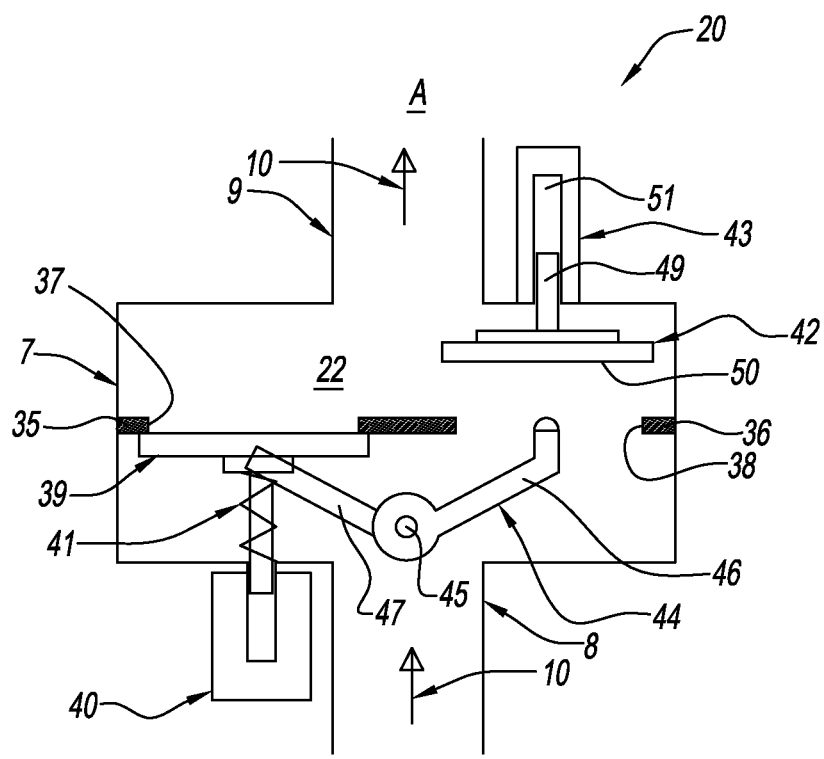

The embodiment according to FIGS. 6 to 8 differs from the embodiment of FIG. 5 by the provision of rocker lever 44 that is pivotally mounted within housing 7 and cooperating with vacuum valve disc 39 and pressure relief valve disc 42. All components and features that correspond to the embodiment of FIG. 5 are designated with the same reference numerals so that reference can be made to the respective description of FIG. 5.

As can be seen from FIGS. 6 to 8, rocker lever 44 comprises first rocker arm 47 that is fixed to vacuum valve disc 39. Rocker lever 44 comprises second arm 46 that abuts an end face 50 of pressure relief valve disc 42. Bearing 45 is provided that pivotally supports rocker lever 44 within housing 7 to allow pivoting movement that can be seen in FIGS. 6 and 7.

Also with this embodiment, a high negative pressure within cooking chamber 15 moves vacuum valve disc 39 downwardly against the biasing force of spring 41 that results in a pivoting movement of rocker lever 44 so that rocker arm 46 lifts pressure relief disc 42 upwardly, as can be seen in FIG. 7. This movement opens both valve seat openings 37 and 38 so that the full cross-sectional area is open for flow of air 11 from atmosphere A to cooking chamber 15 and through interior chamber 22.

FIG. 8 shows the situation of an overpressure in cooking chamber 15. In this case, valve seat opening 37 is closed by vacuum valve disc 39 while the high pressure and flow of air 10 lifts pressure relief valve disc 42 upwardly, thus opening valve seat opening 38. In this manner, the flow path is open from cooking chamber 15 to atmosphere via conduit 8, internal chamber 22 and conduit 9.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

What is claimed is:

1. A valve arrangement of a cooking device having a cooking chamber, the valve arrangement disposed in a housing having an interior chamber, the housing having a first conduit having a first discharge cross-section connecting the interior chamber with the cooking chamber and a second conduit having a second discharge cross-section connecting the interior chamber with an outside atmosphere, the valve arrangement comprising:
   a socket disposed in association with the second conduit, wherein the socket provides a valve seat having a valve seat opening disposed in the interior chamber in fluid communication with the second conduit, and wherein the valve seat opening has a cross-section larger than the second discharge opening; and
   a valve disc means comprising a vacuum valve disc having at least one through-hole and a cross-section larger than the valve seat opening and a relief valve disc disposed on and moveable away from the vacuum valve disc and having a cross-section that is smaller than the valve seat opening, wherein the relief valve disc closes the at least one through-hole when disposed adjacent the vacuum valve disc, wherein they vacuum valve disc is moveable between a closed position seated on the valve seat opening and an open position disposed away from the valve seat opening, such that at a negative pressure in the cooking chamber the vacuum valve disc moves from the closed position to the open position, and such that at a positive pressure in the cooking chamber the vacuum valve disc remains in the closed position and the relief valve disc moves away from the vacuum valve disc and opens the at least one through-hole.

2. The valve arrangement according to claim 1, wherein the valve seat opening is also larger than the discharge cross-section of the first conduit.

3. The valve arrangement according to claim 1, wherein the vacuum valve disc comprises a plurality of through-holes and the relief valve disc closes the plurality of through-holes when disposed adjacent the vacuum valve disc.

4. The valve arrangement according to claim 3, wherein the valve disc means is biased in the closed position.

5. The valve arrangement according to claim 4, wherein the valve disc means further comprises a first stem extending from the vacuum valve disc to an actuator and wherein the valve disc means is biased in the closed position by a spring surrounding the first stem.

6. The valve arrangement according to claim 5, wherein the actuator moves the valve disc means between the open and closed position for the purpose of dehumidification of the cooking chamber.

7. The valve arrangement according to claim 1, wherein the relief valve disc is biased in position adjacent the vacuum valve disc to close the at least one through-hole.

8. The valve arrangement according to claim 7, wherein the valve disc means further comprises a second stem having a stop plate affixed to an end of the stem, wherein the relief valve disc is biased in position adjacent the vacuum valve disc by a spring surrounding the second stem, wherein one end of the spring abuts the relief valve disc and another end of the spring abuts the stop plate.

9. The valve arrangement according to claim 1, wherein the movement of the valve disc means at the negative pressure and the movement of the relief valve disc at a positive pressure occur automatically.

10. A valve arrangement of a cooking device having a cooking chamber, the valve arrangement disposed in a housing having an interior chamber, the housing having a first conduit having a first discharge cross-section connecting the interior chamber with the cooking chamber and a second conduit having a second discharge cross-section connecting the interior chamber with an outer atmosphere, the valve arrangement comprising:

first and second valve seats disposed adjacent each other in the interior chamber between the first and second conduits, wherein the first and second valve seats each has a valve seat opening comprising a discharge cross-section;

a vacuum valve disc having a cross-section larger than the first valve seat opening and disposed between the first valve seat and the first conduit, wherein the vacuum valve disc is moveably disposed between a closed position on the first valve seat and an open position away from the first valve seat; and a relief valve disc having a cross-section larger than the second valve seat opening and disposed between the second valve seat and the second conduit, wherein the relief valve disc is moveably disposed between a closed position on the second valve seat and an open position away from the second valve seat, such that at a negative pressure in the cooking chamber at least the vacuum valve disc moves away from the first valve seat, and such that at a positive pressure in the cooking chamber at least the relief valve disc moves away from the second valve seat.

11. The valve arrangement according to claim 10, wherein the first and second valve seats each has a discharge cross-section larger than the discharge cross-section of each of the first and second conduits.

12. The valve arrangement according to claim 10, wherein the first valve seat is disposed proximal the second conduit and distal the first conduit and the second valve seat is disposed proximal the first conduit and distal the second conduit.

13. The valve arrangement according to claim 10, wherein the vacuum valve disc is biased by a spring to a closed position on the first valve seat to close the first valve seat opening.

14. The valve arrangement according to claim 13, further comprising an actuator cooperatively arranged with the vacuum valve disc for moving the vacuum valve disc to an open position away from the first valve seat opening.

15. The valve arrangement according to claim 10, wherein the relief valve disc further comprises a stem and the housing further comprises a guide, wherein the stem is moveably disposed in the guide, and wherein when the relief valve disc is moveably disposed away from the second valve seat stem, the stem moves into the guide.

16. The valve arrangement according to claim 10, further comprising a rocker lever pivotally mounted in the housing, wherein the rocker lever is disposed in cooperating contact with the vacuum valve disc and the relief valve disc, and wherein the rocker lever comprises a first rocker arm fixed to the vacuum valve disc and a second rocker arm abutting the relief valve disc.

17. The valve arrangement according to claim 10, wherein the movement of at least the vacuum valve disc at the negative pressure and the movement of the relief valve disc at a positive pressure occur automatically.

* * * * *